Patented May 24, 1927.

1,629,563

UNITED STATES PATENT OFFICE.

SIGURD WESTBERG, OF GERMANTOWN, PENNSYLVANIA.

PROCESS FOR MAKING IRON AND STEEL.

No Drawing. Application filed October 21, 1924, Serial No. 745,010, and in Norway April 14, 1924.

My invention relates to the production of steel and especially to a process of producing steel from scrap material.

It is among the objects of my invention to provide a process for recovering steel scrap and for thereby producing a steel of substantially the same quality as the material from which the scrap originated.

Another object of my invention is to produce a purified metal without refining the material in a remelting operation.

Heretofore, scrap steel has been disposed of by adding it to the molten pig or other furnace charge in the steel-making furnace or else remelting the scrap and recasting it into ingots for further treatment. Either method of disposing of the scraps was objectionable. At times, impurities such as oxides or extraneous adhering materials were introduced into the melted furnace charge and at other times the scrap contained a metallic alloy material that was objectionable.

Still another objection was that the scrap had to be treated and refined the same as any other inferior and impure material. The latter was an inefficient and expensive process, especially where the scrap consisted of stampings and cuttings made from specially prepared and purified material and involved a difficult and expensive process of preparation, such as high grade scrap from silicon or other alloy steels. For example, a particular objection to the use of silicon steel scrap as an addition to the charge in the open hearth furnaces was that the silicon destroyed the lining of the furnace. If it was desired to refine the silicon steel by itself, the silicon would be slagged off, impurities would be introduced, and a steel inferior to the original would be produced.

Where a considerable amount of scrap produced from cuttings and punchings from specially prepared material accumulates, it is advisable to separate each particular kind of scrap and to reclaim the steel therefrom by my process.

In my Norwegian application No. 30493, filed April 14, 1924, and Norwegian application No. 30,494, filed April 14, 1924, I have described a process providing means of reclaiming such metal and of eliminating oxides and other impurities ordinarily introduced in a remelting process. I cause the scrap to be compacted into bundles either before or during a process of heating the material. The material is heated to a welding temperature in a non-oxidizing atmosphere and consolidated by any well known process into bars by a welding operation.

For example, the scrap, comprising mainly cuttings and punchings of sheet material of various thicknesses and shapes, may be pressed together and baled as tightly as possible and heated in a closed furnace in a reducing atmosphere. The pretreatment may or may not include pickling. However, in some cases it is preferable to pickle the material in order to remove most of the adherent foreign material. If preferred, the material may be introduced into a furnace in the unbaled condition and allowed to form bundles therein by reason of the inherent property of the highly heated metal to stick together.

The atmosphere is preferably a hydrogen atmosphere, but other reducing atmospheres may be used such as a mixture of hydrogen with another gas, as carbon monoxide, hydro-carbon gases or nitrogen. The material is heated in the reducing atmosphere to a welding heat, the required temperature depending somewhat on the nature of the metal being treated. By means of this treatment, the oxides, and other slag forming materals or impurities of the metal are reduced so that the material is susceptible to welding. This treatment by reason of the combination of the impurities with the gases, may also purify the metal to some extent by removing such elements as phosphorus, sulphur and oxides existing on the surface as well as in the interior of the metal. The most desirable temperature at which the material welds varies somewhat depending upon the nature of the alloy. For silicon steel a preferred temperature is about 1300° C. If desired, the material may be preheated in any furnace such as a gas-fired furnace to any temperature that does not detrimentally oxidize the metal.

After the bungled material or aggregate is heated to the welding temperature in a reducing atmosphere, it is taken out and hammered or rolled in order to consolidate the scrap. The penetration of oxygen into the material is extremely small on account of the compactness of the bundle and for that reason a satisfactory consolidation of the metal is readily obtained without the loss of alloying constituents.

A modification of my process may be utilized where it is advisable to remove such impurities as oxygen, sulphur and phosphorus and to economize in hydrogen. For this purpose, I make use of oxides of the alkaline earth metals and silicides of such metals as react with water and with hydrogen sulphide to form non-volatile oxides or sulphides and to liberate hydrogen.

Among the silicides that may be utilized for this purpose are the silicides of iron, aluminium and of the alkaline earth metals.

This modification of my process results from the desirability of removing a comparatively large proportion of impurities in the metal that originally existed in the steel or were previously introduced in fabricating the steel. In removing the impurities, the period of heating must be continued for a longer or shorter time according to the amount of impurities to be removed. In order to shorten this time as much as possible, the reducing gas must be freed as far as possible from hydrogen sulphide and phosphine.

In maintaining the metal at a welding temperature in an atmosphere containing hydrogen and a minimum of the above impurities, a large quantity of hydrogen would be necessary if the impurities were swept away entirely by the replacement of the reducing gas. Therefore, in order to maintain the optimum condition of maximum vapor pressure for the impurity that is being removed, I utilize the above named regenerating materials. Lime acts to simply remove hydrogen sulphide or phosphine from the mixture and the silicides act to remove water, sulphur or phosphorus from the gases and simultaneously to regenerate hydrogen.

The regenerating and purifying material may be put in the heating chamber in close proximity to the metal, or if means are available, the impure gases may be circulated through the material in an additional heated chamber.

In practicing my invention, I am able to recover scrap material and to manufacture steel of a high degree of purity without subjecting the material to a remelting operation. I utilize a reducing gas containing hydrogen and a minimum proportion of gases that contain scale-forming impurities, such as sulphur and phosphorus, which militate against good welding surface conditions in the heated metal.

Although I have described a process of producing steel by welding together scrap material and certain modifications thereof, I do not wish to be limited thereto. For example, I may prepare a bundle of scrap material either with or without pickling by compressing the material into a metal casing. The casing may be employed either with or without perforations. Still other modifications of my invention will suggest themselves to those skilled in the art without departing from the spirit of my invention, the scope of which is defined in the annexed claims:

I claim as my invention:

1. The process of making steel which comprises forming an aggregate of separate pieces of metal, heating to a welding temperature in a reducing gas containing hydrogen, thereby forming gaseous compounds with impurities in said metals forming non-gaseous compounds of another metal and said impurities, and welding.

2. The process of making steel which comprises forming an aggregate of subdivided metal, heating to a welding temperature in a reducing gas containing hydrogen, thereby forming gaseous compounds with impurities in said metal, forming non-gaseous compounds of said impurities with a compound of an alkaline earth metal and welding.

3. The process of making steel which comprises forming an aggregate of subdivided metal, heating to a welding temperature in a reducing gas containing hydrogen, thereby forming gaseous compounds with impurities in said metal, forming non-gaseous compounds of said impurities with an oxide of an alkaline earth metal and welding.

4. The process of making steel which comprises forming an aggregate of subdivided metal, heating to a welding temperature in a reducing gas containing hydrogen, thereby forming gaseous compounds with impurities in said metal, forming non-gaseous compounds of said impurities with calcium oxide and welding.

5. The process of making steel which comprises forming an aggregate of subdivided metal, heating to a welding temperature in a reducing gas containing hydrogen, thereby forming gaseous compounds with impurities in said metal, forming non-gaseous compounds of said impurities with silicides and oxides of a metal.

6. The process of making steel which comprises forming an aggregate of separate pieces of metal, heating to a welding temperature in a reducing gas containing hydrogen, thereby forming gaseous compounds with impurities in said metals, maintaining said gas in contact with a material capable of forming non-gaseous compounds with said impurities, and welding.

7. The process of making steel which comprises forming an aggregate of separate pieces of metal, heating to a welding temperature in the presence of a gas containing hydrogen, thereby forming gaseous compounds with the impurities in said metals, forming non-gaseous compounds with said impurities by interaction between another substance and said gaseous compounds, and welding.

8. The process of making steel which comprises forming an aggregate of separate pieces of metal, heating to a welding temperature in the presence of a gas containing hydrogen, thereby forming gaseous compounds with the impurities in said metal, forming non-gaseous compounds and a reducing gas by interaction between another substance and said gaseous compounds, and welding.

9. The process of making steel which comprises forming an aggregate of separate pieces of metal, heating to a welding temperature in the presence of a gas containing hydrogen and a solid material capable of forming non-gaseous compounds with the impurities of said metal, and welding.

10. The process of making steel which comprises forming an aggregate of separate pieces of metal, heating to a welding temperature in the presence of a gas containing hydrogen and a solid material capable of regenerating a reducing gas and forming non-gaseous compounds with the impurities of said metal, and welding.

11. The process of making steel from subdivided metal in the solid condition which comprises compressing the same into a unitary closely compacted form, heating to about 1300° C. in hydrogen thereby removing impurities that form non-adherent compounds with iron and then welding.

12. The process of making steel from subdivided metal in the solid condition which comprises compressing the same into a unitary closely compacted form, heating to about 1300° C. in an atmosphere containing hydrogen thereby forming gaseous hydrogen compounds of impurities that form non-adherent compounds with iron and then welding.

13. The process of making steel from irregularly shaped subdivided metal which comprises, forming a compact aggregate of said metal in a casing, preheating to a temperature below the welding heat, heating to the welding heat in an atmosphere of hydrogen, and then welding.

14. The process of making steel from irregularly shaped subdivided metal which comprises forming a regularly shaped compact aggregate of said metal, preheating to a temperature below the welding heat, heating to the welding heat in an atmosphere of hydrogen, and then welding.

In testimony whereof, I have hereunto subscribed my name this 8th day of October, 1924.

SIGURD WESTBERG.